US009411118B2

(12) United States Patent
Matz et al.

(10) Patent No.: US 9,411,118 B2
(45) Date of Patent: Aug. 9, 2016

(54) FIBER DISTRIBUTION HUBS AND STORAGE RETAINING MODULES

(71) Applicant: Opterna Technology Limited, Limerick (IE)

(72) Inventors: Bret A. Matz, Leesburg, VA (US); Benoy Sarasan, Kochi (IN); Beevi M. Mohammedali, Kochi (IN); P. V. Ashwin, Kochi (IN); C. S. Subash, Kochi (IN)

(73) Assignee: Opterna Technology Limited, Limerick (IE)

(*) Notice: Subject to any disclaimer, the term of this patent is extended or adjusted under 35 U.S.C. 154(b) by 0 days.

(21) Appl. No.: 14/248,835

(22) Filed: Apr. 9, 2014

(65) Prior Publication Data

US 2014/0301709 A1    Oct. 9, 2014

Related U.S. Application Data

(60) Provisional application No. 61/810,175, filed on Apr. 9, 2013.

(51) Int. Cl.
    *G02B 6/00*            (2006.01)
    *G02B 6/44*            (2006.01)

(52) U.S. Cl.
    CPC .................................. *G02B 6/4452* (2013.01)

(58) Field of Classification Search
    USPC .......................................................... 385/135
    See application file for complete search history.

(56) References Cited

U.S. PATENT DOCUMENTS

| | | | |
|---|---|---|---|
| 7,190,874 B1* | 3/2007 | Barth et al. ................... | 385/135 |
| 2006/0269204 A1* | 11/2006 | Barth et al. ................... | 385/135 |
| 2009/0110359 A1* | 4/2009 | Smith .................... | G02B 6/445 |
| | | | 385/135 |
| 2011/0211799 A1* | 9/2011 | Conner et al. ................ | 385/135 |
| 2014/0314384 A1* | 10/2014 | Nair et al. ..................... | 385/135 |

* cited by examiner

*Primary Examiner* — Eric Wong
(74) *Attorney, Agent, or Firm* — Sterne, Kessler, Goldstein & Fox P.L.L.C.

(57) ABSTRACT

A fiber distribution hub (FDH) can include an enclosure defining an interior region and a frame body having a longitudinal axis. The frame body is rotatably mounted within the interior region of the enclosure such that the frame body can rotate about the longitudinal axis relative to the enclosure. The FDH further includes a plurality of splitters coupled to the frame body. Each splitter module has at least one splitter input and at least two splitter outputs. The FDH also includes a first plurality of adapters coupled to the frame body. The first plurality of adapters is configured to optically couple to splitter output cables. Additionally, the FDH can also include a storage retaining module configured to be selectively coupled to the frame body. The storage retaining module includes a storage retaining structure configured to selectively secure a cable portion of a connectorized end of a splitter output cable.

25 Claims, 14 Drawing Sheets

FIBER DISTRIBUTION HUBS AND STORAGE RETAINING MODULES

This application incorporates by reference in its entirety U.S. Provisional Application No. 61/810,175, filed Apr. 9, 2013.

BACKGROUND

1. Field

The present invention relates to fiber optic distribution systems and, particularly, to fiber distribution hubs used in fiber optic distribution systems.

2. Background

One type of fiber optic distribution system is a point-to-multipoint system. In point-to-multipoint systems, a single optical fiber from a service provider's central office services multiple optical network units at the end-user locations, for example, residences, apartments, or businesses. For example, a single optical fiber can service one hundred and twenty eight end users. Optical components such as switches and routers in active optical networks, unpowered optical splitters in passive optical networks (PONS), and fiber optic cables distribute the optical signals between the service provider's location and the end users. A fiber distribution hub (FDHs) can house these optical components.

Because each feeder fiber from a service provider's central office can be optically coupled to hundreds of outgoing distribution fibers, FDHs often have a high density of fiber optic cables and a large quantity of optical components to distribute the signal from the feeder cable to the fibers of the distribution cable. For example, in a PON, an FDH may include several splicing cassettes that optically couple a feeder cable with multiple optical splitters and multiple adapters for optically coupling the splitters to the distribution cable.

Accordingly, there is a need for an FDH that arranges these optical components and fiber optic cables in a manner that the degradation of the transmitted optical signals is minimized. There is also a need for an FDH that provides easy access to all of the enclosed optical components and fiber optic cables to allow for replacement or maintenance.

BRIEF SUMMARY

A fiber distribution hub can interface a service provider location and one or more access terminals in a fiber distribution system. A fiber distribution hub can include an enclosure defining an interior region and a frame body having a longitudinal axis. The frame body is rotatably mounted within the interior region of the enclosure such that the frame body can rotate about the longitudinal axis relative to the enclosure. The fiber distribution hub can also include a plurality of splitter modules coupled to the frame body. Each splitter module can have at least one splitter input and at least two splitter outputs. The fiber distribution hub can have a first plurality of adapters coupled to the frame body that are configured to optically coupled to splitter output cables. The fiber distribution hub can also include a storage retaining module configured to be selectively coupled to the frame body. The storage retaining module includes a storage retaining structure configured to selectively secure a cable portion of a connectorized end of a splitter output cable.

Figure 1:
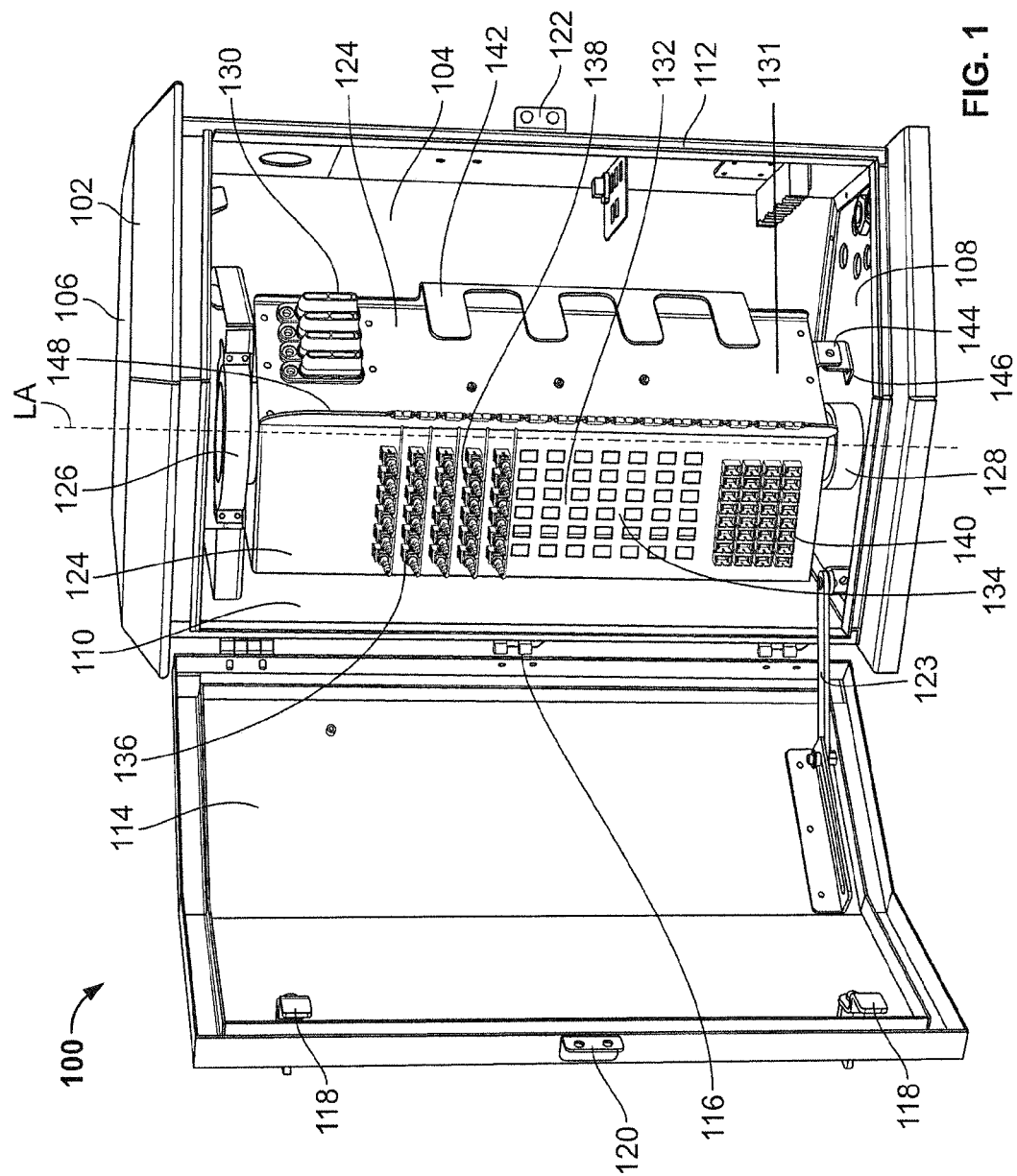
FIG. 1 is a perspective view of a fiber distribution hub.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 13:
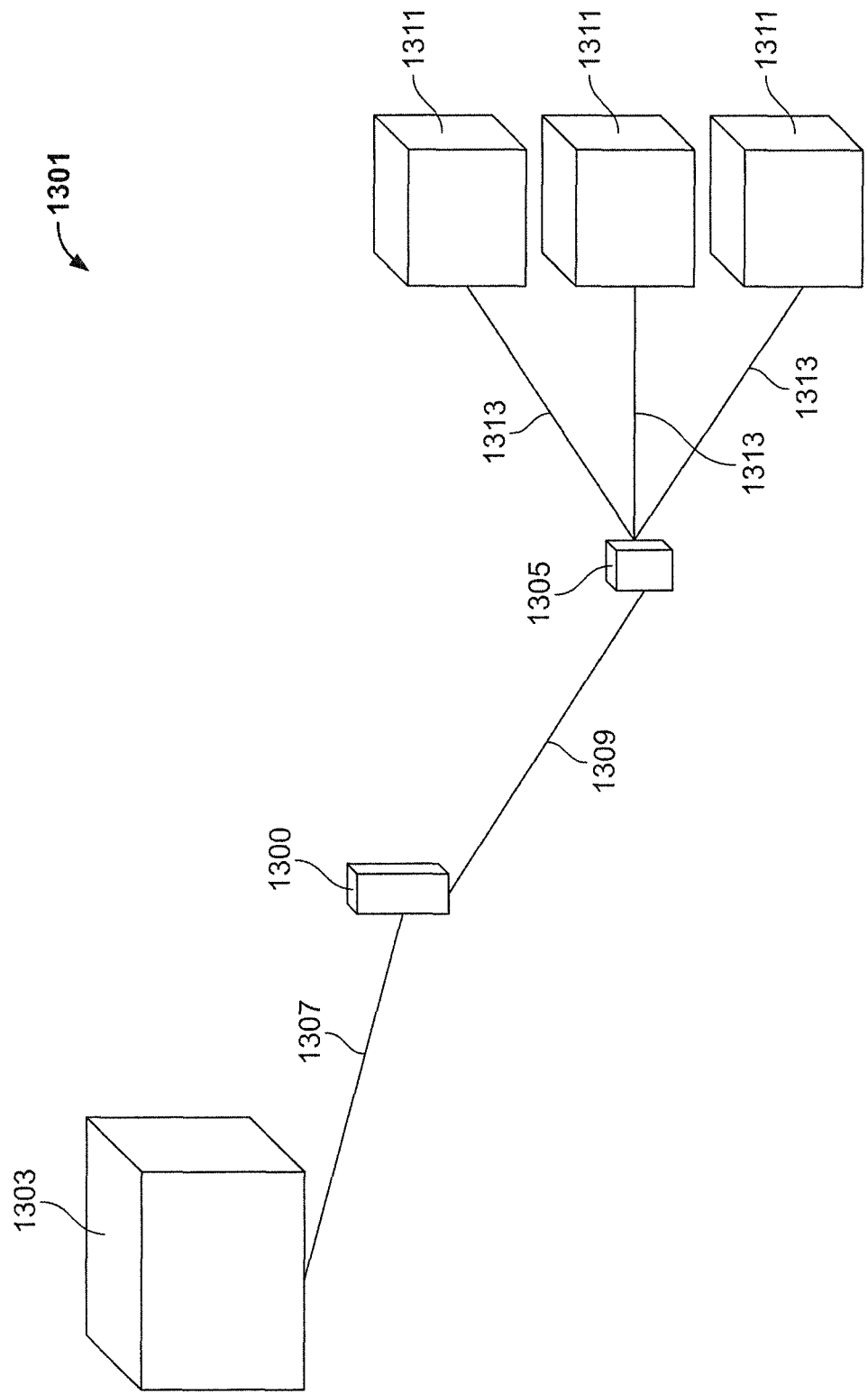
FIG. 13 is a schematic illustration of a fiber distribution system using a fiber distribution hub.

FIG. 13 schematically illustrates a fiber optic distribution system 1301. As shown in FIG. 13, fiber optic distribution system 1301 can include a service provider location 1303 and one or more access terminals 1305. Service provider location 1303 may be a service provider central office or a local service provider supply location. A fiber distribution hub (FDH) 1300 optically couples service provider location 1303 to access terminal 1305. FDH 1300 can receive one or more multi-fiber feeder cables 1307 from service provider location 1303. FDH 1300 provides optical signals to end users 1311 by one or more distribution cables 1309 that interface access terminal 1305. End users 1311 receive the optical signals from access terminal 1305 through one or more drop cables 1313. A person skilled in the relevant art would understand FDH 1300 can be used in fiber optic distribution systems that vary from the one illustrated in FIG. 13. For example, FDHs can be used in high fiber density applications such as data centers.

FIGS. 1-5 illustrate an FDH 100 as described in International Application No. PCT/US2012/023509, filed Feb. 1, 2012, which is incorporated by reference herein in its entirety. FDH 100 is configured to split one or more optical signals from a feeder cable (not shown in FIGS. 1-5) into a plurality of optical signals for distribution to one or more end users through one or more distribution cables (not shown in FIGS. 1-5). In some embodiments, a number of subscribers may be routed to FDH 100 for connection to optical splitters housed therein. The splitters split the optical signal in feeder fibers into a plurality of signals for distribution to the end users through a multi-fiber distribution cable.

Figure 2:
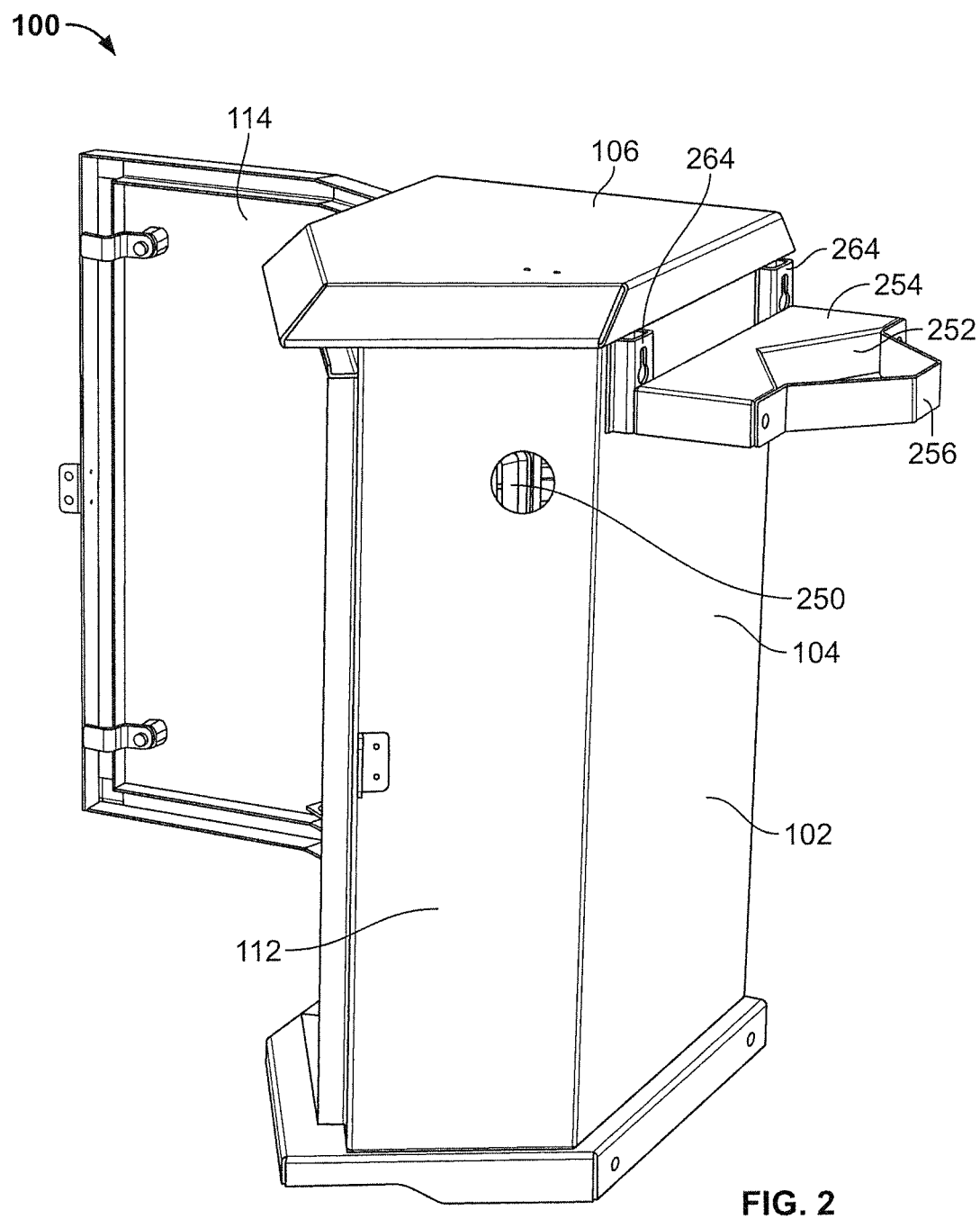
FIG. 2 is another perspective view of the fiber distribution hub shown in FIG. 1.
Figure 3:
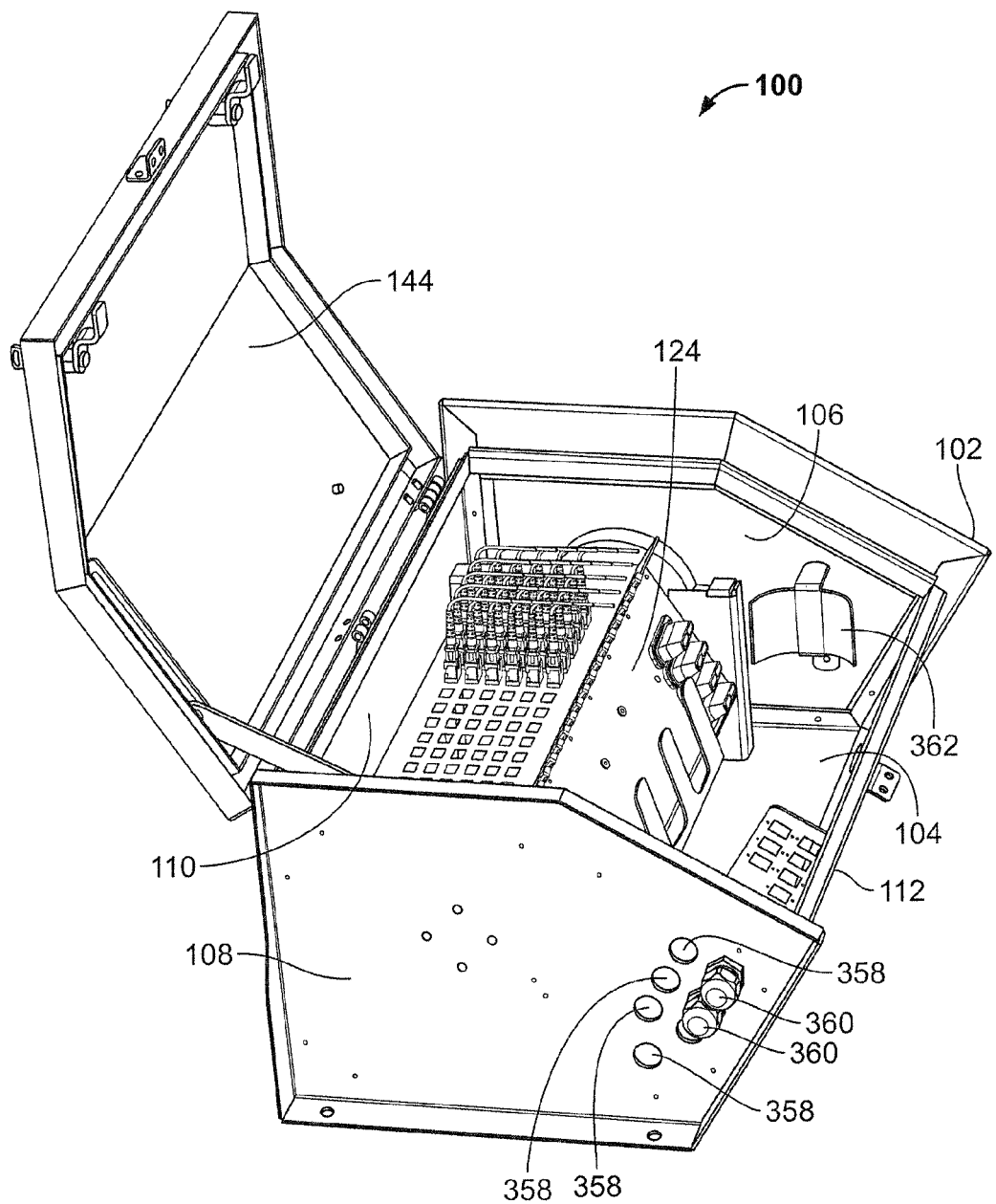
FIG. 3 is yet another perspective view of the fiber distribution hub shown in FIG. 1.

FIGS. 1-3 are perspective views of FDH 100. FDH 100 includes an enclosure 102. Enclosure 102 defines an interior region. Enclosure 102 can include a first panel 104, a pair of opposing panels 106 and 108 extending from first panel 104, and a second pair of opposing panels 110 and 112 extending from first panel 104. Panel 110 is between opposing panels 106 and 108, and panel 112 is between opposing panels 106 and 108. Panels 106, 108, 110, and 112 collectively define an opening to the interior region of enclosure 102.

Enclosure 102 can also include panel 114 that is configured to be selectively movable between a first position (not shown) that closes the interior region opening defined by panels 106, 108, 110, and 112 to a second position (as shown in FIGS. 1-3) that provides access to the interior region of enclosure 102. Panel 114 can be movably coupled to panel 110 by one or more hinges 116. Panel 114 can have one or more locking mechanisms that prevent panel 114 from moving away from the first position that closes the interior region opening and prevents access. For example, panel 114 can have two latches 118 on first and second ends of panel 114 that selectively engage panel 112. Engagement between latches 118 and panel 112 prevents panel 114 from opening. Panel 114 can also include a locking plate 120 extending from an edge of panel 114, and panel 112 can include a corresponding locking plate 122. When panel 114 is in the first closed position, a hole defined by locking plate 120 aligns with a hole defined by locking plate 122. A pad lock or any other suitable locking device can pass through the aligned holes defined by locking plates 120 and 122, which prevents panel 114 from opening.

Enclosure 102 can also include a rotational restraint that prevents panel 114 from rotating past a certain position. As shown in FIG. 1, the rotational restraint can be an arm 123 rotatably connected to panel 108 and slidably coupled to a bracket on panel 114. As panel 114 rotates away from the closed first position, arm 123 rotates relative to panel 108 and slides relative to the bracket on panel 114 until arm 123 contacts a surface of the bracket, which prevents further rotation of panel 114.

Enclosure 102 can provide environmental protection for any components housed within the interior region. In some embodiments, enclosure 102 can create an environmental seal that prevents dust or other contaminants from entering the interior region when panel 114 is in the closed first position.

Enclosure 102 can also prevent external forces from being applied to any components housed within the interior region of enclosure 102. Enclosure 102 can be made of any suitable rigid or semi-rigid material, for example, metal (such as aluminum), plastic, or any other suitable material for protecting the internal components of enclosure 102.

Enclosure 102 can form any suitable shape for containing optical components. For example, enclosure 102 can form a pentagonal prism as shown in FIGS. 1-3. Panel 104 and panel 106 can be congruent pentagons, and panels 108, 110, and 112 can extend between panels 104 and 106. In other embodiments, enclosure 102 forms other suitable three-dimensional shapes, for example, square or rectangular prisms, a cylinder, or any other suitable three-dimensional curvilinear shape.

FDH 100 can be configured to be coupled to one or more multi-fiber feeder cables (not shown) and to one or more multi-fiber distribution cables (not shown). Accordingly, enclosure 102 can define one or more openings for passing the one or more multi-fiber feeder cables and the one or more multi-fiber distribution cables. As shown in FIG. 2, panel 112 of enclosure 102 can define an opening 250 for ventilation. As shown in FIG. 3, panel 108 defines one or more openings 358 for passing the feeder or distribution cables. FDH 100 can also include one or more fittings 360 coupled to openings 358. Fittings 360 can be configured to secure the fiber optic cables passing through the respective opening 358 to enclosure 102. In other embodiments not shown, panel 106 can define one or more openings for passing the feeder or distribution cables.

Enclosure 102 can also include one or more cable routing guides configured to route fiber optic cables within enclosure 102. For example, enclosure 102 can include a cable routing guide 362 on an inner surface of panel 106 as shown in FIG. 3. Cable routing guide 362 can be configured to route fiber optic cables passing through openings 358.

FDH 100 can be configured to be mounted to a pedestal base or to a pole. As shown in FIG. 2, FDH 100 can include a pole mounting bracket 252. Bracket 252 can be selectively coupled to enclosure 102 using a pair of brackets 264 having slots configured to receive retaining pins on bracket 252. Bracket 252 includes a base 254 and a band 256. Collectively, base 254 and band 256 define an opening for receiving a pole upon which FDH 100 can be mounted. Band 256 can be selectively coupled to base 254 using any suitable fastener, for example, bolts, screws, or any other suitable fastener.

In some embodiments, frame body 124 is rotatably coupled to enclosure 102. Frame body 124 has a longitudinal axis LA about which frame body 124 can rotate. Longitudinal axis LA can be perpendicular to panel 108. In some embodiments, longitudinal axis LA is also perpendicular to a mounting surface, for example, the ground or floor, upon which FDH 100 is mounted. In some embodiments, frame body 124 is configured to rotate such that entire frame body 124 remains within the interior region of enclosure 102 throughout the entire angular displacement of frame body 124. Frame body 124 can rotate when optical components mounted thereon are coupled to the one or more distribution cables and the one or more feeder cables.

Frame body 124 can be configured to rotate about longitudinal axis LA in both rotational directions, for example, clockwise and counter-clockwise when viewed from panel 106. Frame body 124 can be coupled to enclosure 102 using a pair of bearing mounts 126 and 128 that are axially aligned with longitudinal axis LA as shown in FIG. 1. Bearing mounts 126 and 128 can be plain bearings, roller-element bearings (for example, ball bearings or roller bearings), or any other suitable bearings. In some embodiments, one bearing mount may be a plain bearing and the other bearing mount may be a roller-element bearing. In embodiments in which bearing mounts 126 or 128 are plain bearings, the plain bearings may use one or more bushings.

Frame body 124 can be configured to house one or more splitters 130. As shown in FIG. 1, frame body 124 includes a splitter panel 131. Optical splitters 130 are configured to be selectively coupled to splitter panel 131. For example, splitter panel 131 can define one or more openings sized to closely receive optical splitters 130. Optical splitters 130 can include one or more locking mechanism for securing optical splitters 130 to splitter panel 131.

One or more multi-fiber feeder cables (not shown) enter enclosure 102 through openings 358. Each feeder cable can include, for example, 12, 24, 48, 72, or any other suitable quantity of fibers. Each feeder cable is then split into single-fiber feeder cables using a break-out device and routed to optical splitters 130 (after splicing cassettes described in more detail below with reference to FIGS. 4 and 5). In some embodiments, splitters 130 can have a 1 input×32 output configuration, a 1 input×16 output configuration, or any other suitable splitter configuration. As shown in FIG. 1, frame body 124 can house four splitters 130. In other embodiments, frame body 124 can be configured to house more or less than four splitters 130.

Frame body 124 can also be configured to house a plurality of adapters 136 that are configured to optically couple splitter output cables 138 (which run from optical splitters 130) to connectorized ends of one or more distribution cables (not shown in FIGS. 1-5). As shown in FIG. 1, frame body 124 can include an adapter panel 132 that defines a plurality of openings 134. Each opening 134 is sized to securely receive adapters 136. Adapter panel 132 can define a 6×12 array of openings 134. In other embodiments, adapter panel 132 can define any other suitable configuration of openings 134 with more or less than 72 openings.

Additionally, frame body 124 can include one or more storage retaining structures 140. Each retaining structure 140 is configured to selectively couple with the ends of splitter output cables 138 when the splitter output cables 138 are not connected to adapters 136. In some embodiments, each retaining structure 140 includes adapters configured to selectively couple to the connectorized ends of splitter output cables 138. In other embodiments, storage retaining structures 140 include clips or any other suitable retaining structures that can selectively couple to unused splitter output cables 138.

Frame body 124 can further include one or more cable routing guides or cable management structures. For example, as shown in FIG. 1, splitter panel 131 can include cable management structure 142. Cable management structure 142 extends from an edge of splitter panel 131 and curves towards the center of splitter panel 131. Cable management structure 142 helps ensure that fiber optic cables routed to and around frame body 124 turn in unison with frame body 124.

Frame body 124 can be configured to rotate in the first direction from a first position (not shown) to a second position (as shown in FIG. 1) at which frame body 124 cannot rotate further in the first direction. In some embodiments, adapter panel 132 is radially aligned with the center of the interior region opening. In some embodiments as shown in FIGS. 1-5, FDH 100 includes a pair of corresponding tabs on enclosure 102 and frame body 124 that contact each at the second position preventing any further rotation in the first direction. As shown in FIG. 1, frame body 124 can include a tab 144 that extends from a surface of frame body 124, and enclosure 102 can include a tab 146 that extends from an inner surface of panel 108 of enclosure 102. Tabs 144 and 146 are positioned such that when frame body 124 is at the second position, tab 144 contacts tab 146 to prevent any further rotation of frame body 124 in the first direction. Tab 144 can define a hole that is aligned with a hole defined by tab 146 when frame body 124 is at the second position. A locking device, for example, a pad lock, clip, or tie, can pass through the aligned holes of tabs 144 and 146 to prevent rotation of frame body 124.

Frame body 124 can also be configured to rotate in a second direction opposite from the first direction such that frame body 124 rotates from the first position to a third position at which frame body 124 cannot rotate any further in the second direction. In some embodiments, the second position and the third position are about 360 degrees apart from each other. In other embodiments, the second position and the third position are less than about 360 degrees apart, for example, 270 degrees, 180 degrees, or any other suitable amount. In such embodiments, enclosure 102 can include a second tab (not shown) that is positioned to contact tab 144 of frame body 124 at the third position, preventing further rotation. Accordingly, a user can selectively rotate frame body 124 between the third position and the second position. During rotation, the optical components of FDH 100 can remain optically coupled to the distribution cables and the feeder cables.

Figure 4:
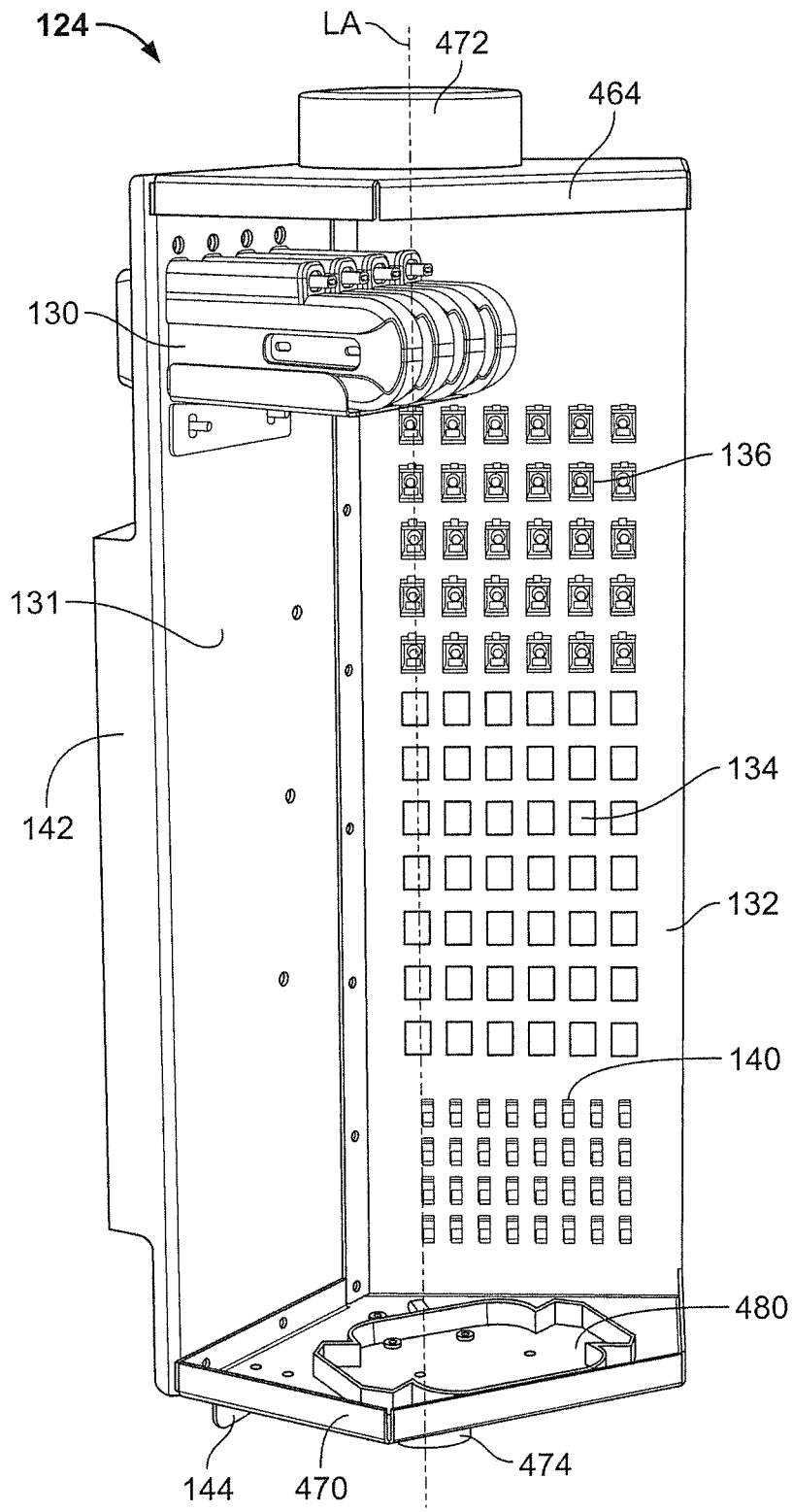
FIG. 4 is a perspective view of the frame body removed from the enclosure shown in the fiber distribution hub of FIG. 1.
Figure 5:
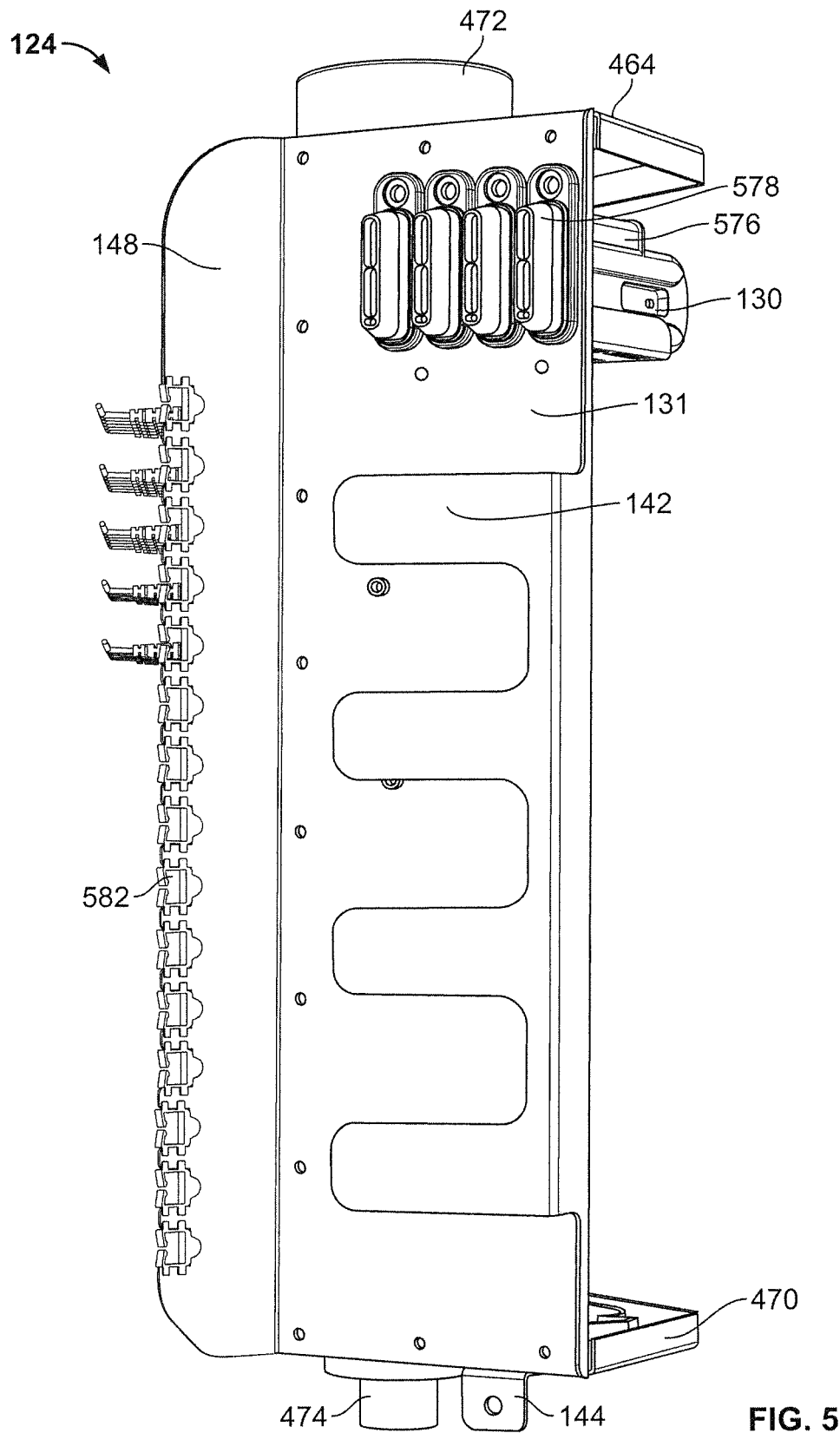
FIG. 5 is a plan view of the frame body shown in FIG. 4.

FIGS. 4 and 5 illustrate frame body 124 removed from enclosure 102. As shown in FIG. 4, frame body 124 can include a first end panel 464 that joins splitter panel 131 and adapter panel 132. First end panel 464 can be perpendicular to both splitter panel 131 and adapter panel 132. Frame body 124 can also include a second end panel 470 that joins splitter panel 131 and adapter panel 132 on an end opposite from first end panel 464. First end panel 464 can be perpendicular to both splitter panel 131 and adapter panel 132.

A boss 472 can extend from an outer surface of first end panel 464. Boss 472 forms, in part, bearing mount 126 of FDH 100. A boss 474 can extend from an outer surface of second end panel 470. In some embodiments, boss 474 forms, in part, bearing mount 128 of FDH 100. Boss 472 and boss 474 can be axially aligned along longitudinal axis LA.

Second end panel 470 can be configured to house one or more splicing cassettes (not shown in FIG. 4). The splicing cassettes are configured to optically couple fibers of one or more distribution cables with single fibers of splitter input cables of splitters 130. For example, a splice cassette tray 480 can be coupled to an inner surface of second end panel 470. Splice cassette tray 480 can be shaped to closely receive one or more splicing cassettes. Accordingly, when frame body 124 rotates, splicing cassettes mounted on second end panel 470 rotate in unison with frame body 124.

FIG. 5 illustrates a side view of frame body 124. Frame body 124 can further include a dividing panel 148 that extends from the intersecting joint of splitter panel 131 and adapter panel 132. In some embodiments, dividing panel 148 defines one or more slots 582. Slots 582 are configured to align splitter output cables 138 from optical splitters 130 with the desired adapters 136 or retaining structures 140.

As best seen in FIG. 5, each optical splitter 130 has an input 576 and multiple outputs 578. A single-fiber splitter input cable is optically coupled to input 576, and a plurality of single-fiber splitter output cables are optically coupled to splitter outputs 578. Splitter input cables are routed from the one or more splice cassettes mounted on second end panel 470 to the inputs 576 of optical splitters 130. Splitter output cables are routed from outputs 578 of splitters 130 through the desired slot 582 in dividing panel 148 to adapters 136 or storage retaining structures 140.

In some embodiments, frame body 124 is configured such that in the third position a user has access to second end panel 470 (and any optical components mounted thereon, for example, one or more splicing cassettes) and inputs 576 of splitters 130 through the interior region opening. Accordingly, FDH 100 can provide access to second end panel 470 and any components mounted thereon (for example, one or more splicing cassettes), inputs 576 of splitters 130, outputs 578 of optical splitters 130, adapters 136, and storage retaining structures 140 through a selective rotation of frame body 124. Accordingly, rotation of frame body 124 provides easy access to any component of FDH 100 for repair or replacement. In some embodiments, frame body 124 can rotate about longitudinal axis LA about 180 degrees in one direction and about 180 degrees in the other direction from the first position. In other embodiments, frame body 124 can rotate more or less than 180 degrees in either direction from the first position.

Although not shown in FIGS. 1-5, frame body 124 can include one or more handles (not shown) that enable a user of FDH 100 to easily rotate frame body 124.

FIGS. 6A, 6B, 7, 8, 9A-9C, and 10-12 illustrate an FDH 600 according to another embodiment. Elements of FDH 600 that are identical, functionally similar, and/or structurally similar to elements of FDH 100 are identified with reference numbers that have the same last two digits as the reference numbers used above with regard to FDH 100 shown in FIGS. 1-5.

Figure 6:
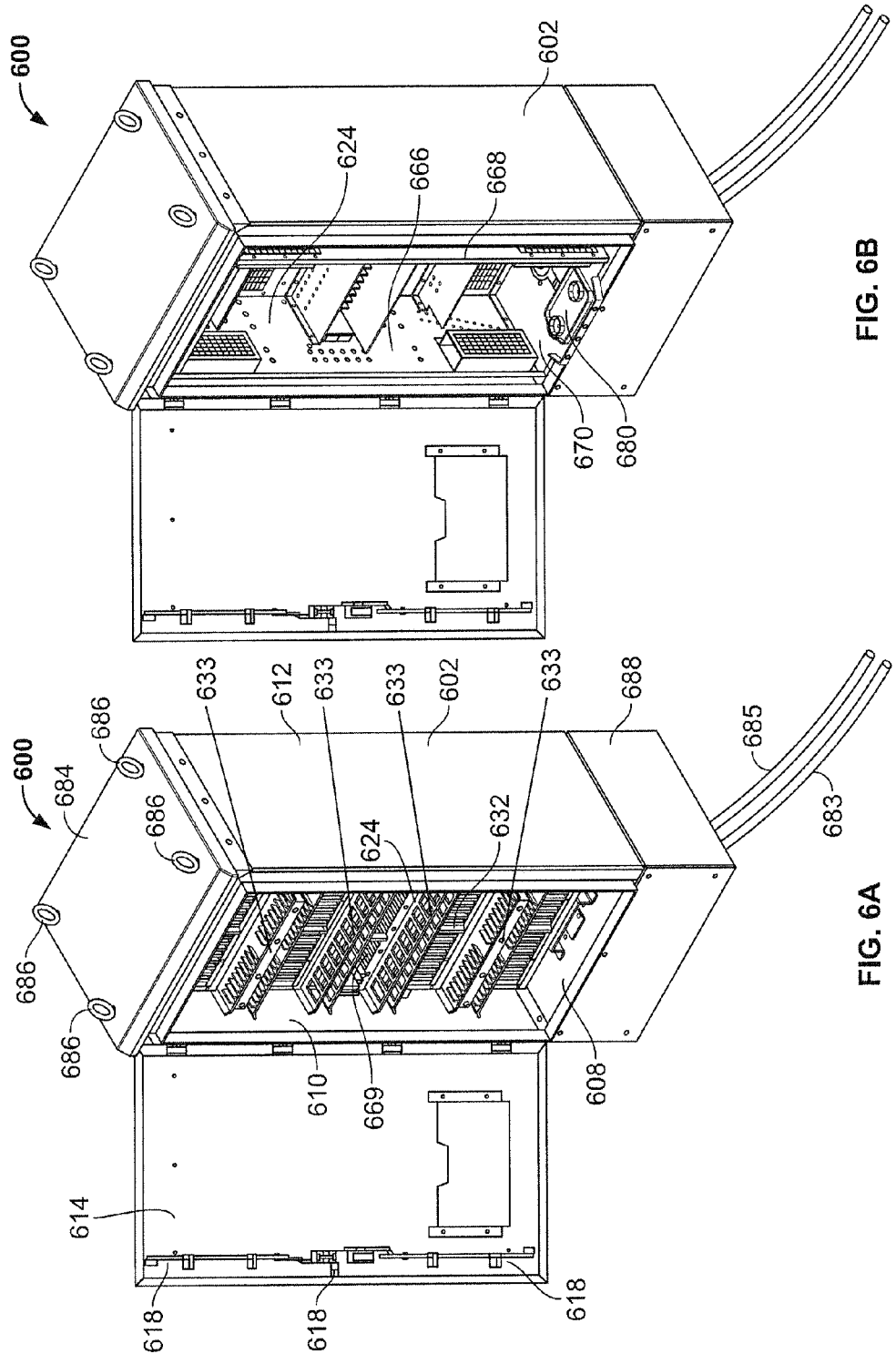
FIGS. 6A and 6B are perspective views of another fiber distribution hub with the frame body in a first position and in a second position, respectively.
Figure 7:
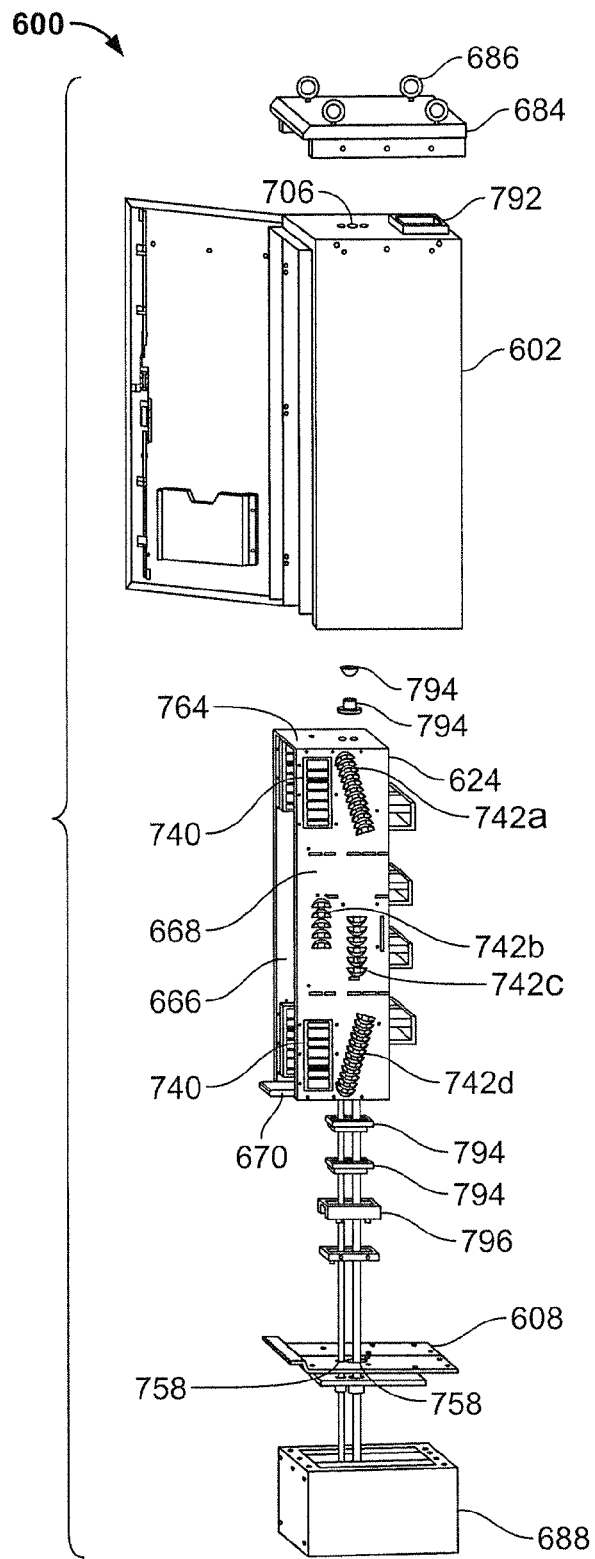
FIG. 7 is an exploded view of the fiber distribution hub shown in FIGS. 6A and 6B.

FIGS. 6A and 6B are perspective views of FDH 600 with frame body 624 in a first position and the frame body in a second position, respectively, and FIG. 7 is an exploded view of FDH 600. FDH 600 includes an enclosure 602 and a frame body 624. Enclosure 602 defines an interior region. As shown in FIGS. 6 and 7, enclosure 602 can include a first panel (not shown, but can be similar to panel 104 of FDH 100), a pair of opposing panels 706 and 608 extending from the first panel, and a second pair of opposing panels 610 and 612 that extends from the first panel. Panel 610 is between the first pair of opposing panels 706 and 608, and panel 612 is between the first pair of opposing panels 706 and 608. Collectively, panels 706, 608, 610, and 612 can define an opening to the interior region of enclosure 602.

Enclosure 602 can also include panel 614. Panel 614 can be configured to be selectively movable between a first position that closes the interior region opening to a second position that provides access to the interior region of enclosure 602 (as shown in FIGS. 6A and 6B). Panel 614 can be movably coupled to enclosure 602 by one or more hinges. Enclosure 602 can provide environmental and external force protection for any components housed within the interior region. Enclosure 602 can form a substantially rectangular prism. In other embodiments, enclosure 602 can form any other suitable shape.

Panel 614 can have one or more locking mechanisms that prevent panel 614 from moving away from the first position that closes the interior region opening and prevents access to the interior region defined by enclosure 602. For example, as shown in FIGS. 6A and 6B, the locking mechanism can be a three-point locking mechanism 618.

FDH 600 is optically coupled to one or more feeder cables 685 and to one or more distribution cables 683. Accordingly, panel 608 can define one or more openings 758 for passing one or more fiber optic cables as shown in FIG. 7.

Panel 608 of enclosure 602 can be configured to be fixedly or selectively coupled to a pedestal base 688. Pedestal base 688 elevates panel 608 to a height that allows one or more feeder cables 685 and one or more distribution cables 683 to easily pass through openings 758 defined by panel 608. Pedestal base 688 is configured to be mounted to any suitable mounting surface, for example, the ground or the floor.

As shown in FIGS. 6A, 6B, and 7, FDH 600 can also include a canopy 684 that is coupled to panel 706 of enclosure 602. Canopy 684 can be configured for attachment to a lifting device such as a crane or boom such that FDH 600 can be easily moved and installed at a desired location. For example, canopy 684 can have one or more lifting hooks 686. Lifting hooks 686 can form complete loops as shown in FIGS. 6A, 6B, and 7, or only partial loops (not shown). A cable, rope, chain, or strap attached to the lifting device can be coupled to lifting hooks 686 to move FDH 600.

As shown in FIG. 7, panel 706 of enclosure 602 can define one or more ventilation openings 792. Ventilation openings 792 allow air to pass from the surrounding atmosphere into the interior region of enclosure 602. Canopy 684 can be configured to overlay ventilation opening 792 to prevent liquid from entering the interior region of enclosure 602 while also allowing ventilation.

Frame body 624 is rotatably coupled to enclosure 602. Frame body 624 has a longitudinal axis LA (shown in FIG. 8) about which frame body 624 can rotate. Longitudinal axis LA can be perpendicular to panel 608 and to a mounting surface, for example, the ground or floor, upon which FDH 600 is mounted. Frame body 624 can be configured to rotate about longitudinal axis LA in both directions. Frame body 624 can be coupled to enclosure 602 using a pair of opposing bearing mounts similar to bearing mounts 126 and 128 described above with reference to FDH 100 shown in FIGS. 1-5. As seen in FIG. 7, the bearing mounts can include one or more bushings 794 that form bearing surfaces therebetween. FDH 600 can also include a bushing holder 796 that is configured to couple bushings 794 of the lower bearing mount to panel 608 to which holder 796 is attached.

Figure 8:
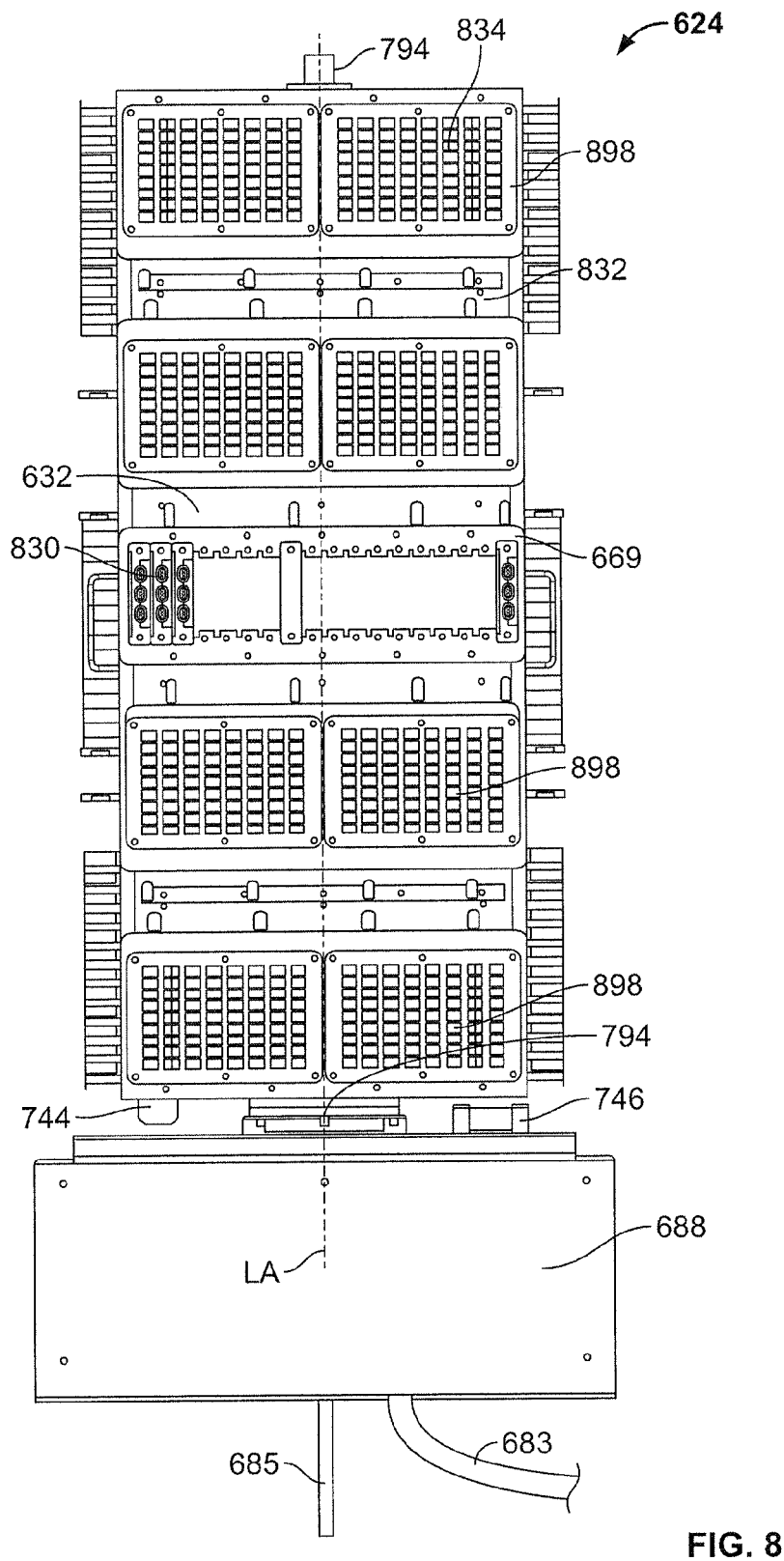
FIG. 8 is a plan view of the fiber distribution hub shown in FIGS. 6A and 6B with a portion of the enclosure removed.
Figure 9C:
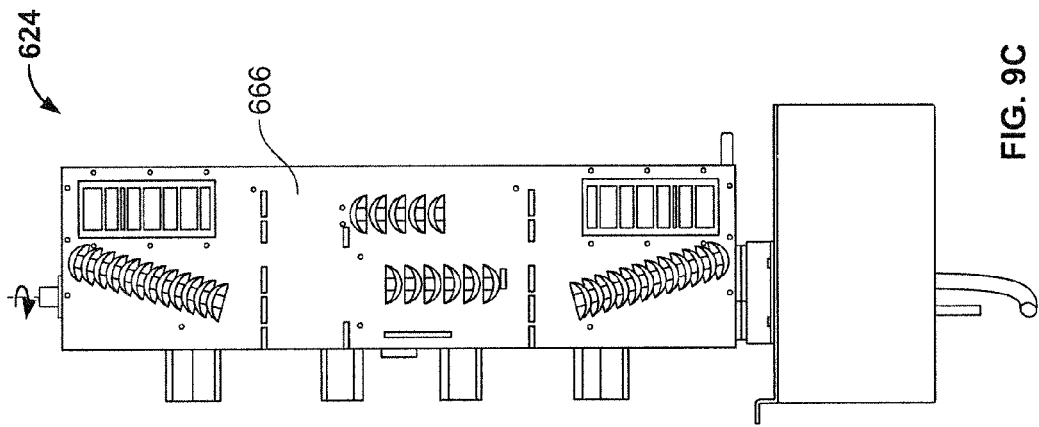
FIGS. 9A, 9B, and 9C are side, front, and side views, respectively, of the fiber distribution hub shown in FIGS. 6A and 6B.
Figure 9B:
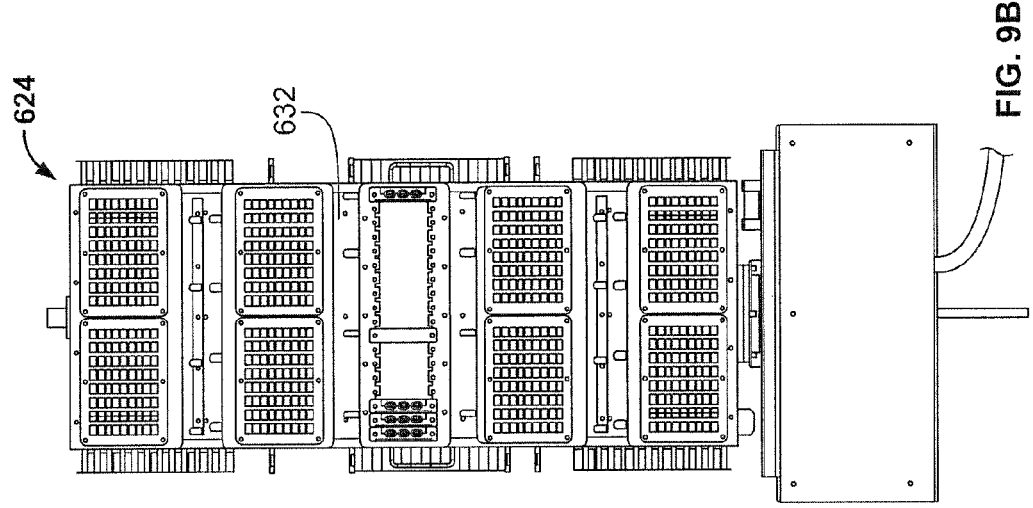
Figure 9A:
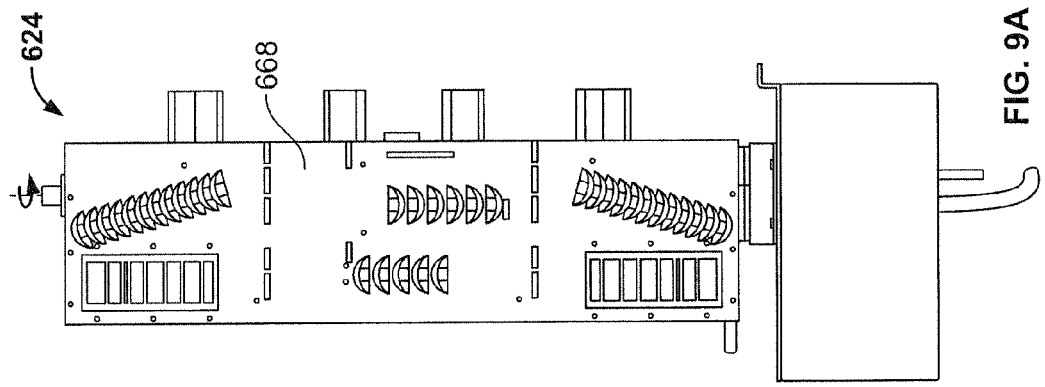
Figure 10:
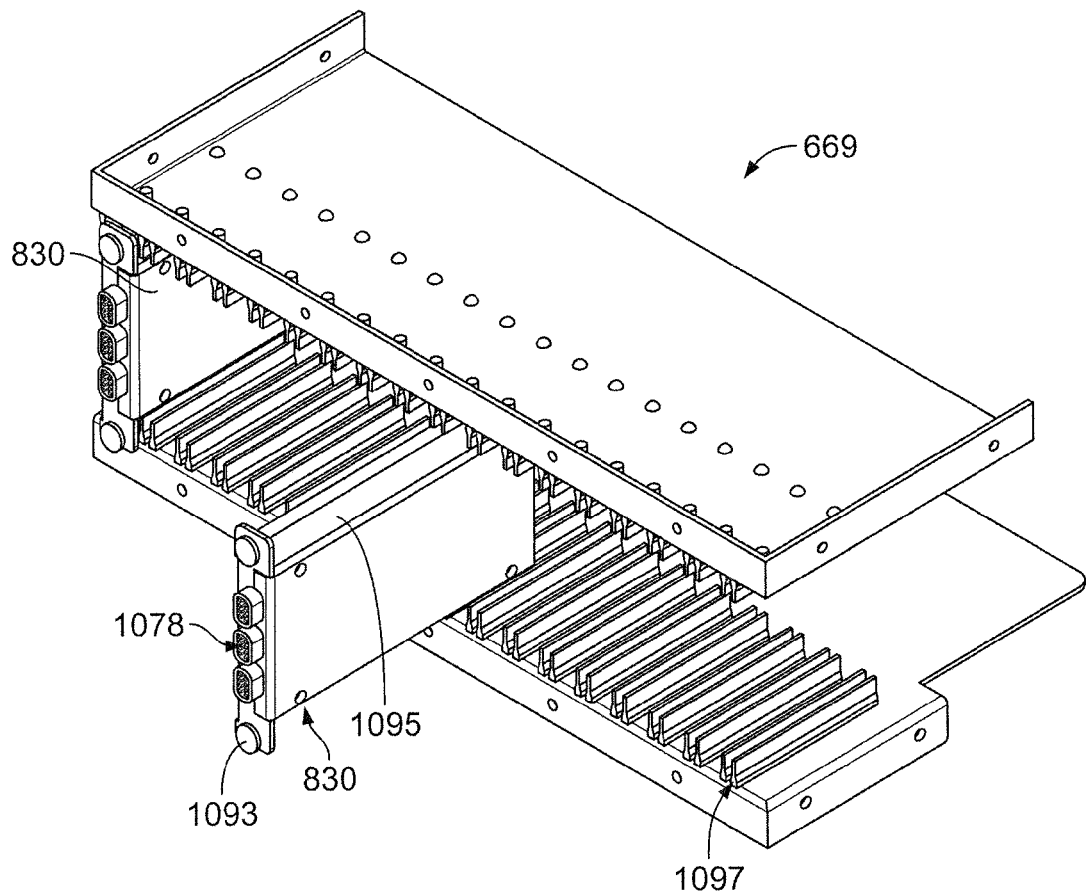
FIG. 10 is a perspective view of a splitter mounting rack for use with the fiber distribution hub shown in FIGS. 6A and 6B.

Frame body 624 can be configured to house one or more optical splitters 830. As shown in FIGS. 6A, 8, and 9B, frame body 624 includes an adapter/splitter panel 632 that defines an opening for receiving a splitter shelf 669. One or more splitters 830 can selectively couple to splitter shelf 669. For example, as shown in FIG. 10, splitter shelf 669 can define a plurality of channels 1097 configured to slidably receive flanges 1095 on each splitter 830. Each splitter 830 can have one more locking mechanisms, for example, nylatches or any other suitable locking mechanism, for selectively coupling splitter 830 to splitter shelf 669. Each splitter 830 can have multiple outputs 1078. In one embodiment, the splitter shelf 669 is located at about the mid-point of the height of adapter/splitter panel 632. An input of splitter 830 can be positioned at an end opposite outputs 1078 or at the same end as outputs 1078.

One or more multi-fiber feeder cables 685 enter enclosure 602 through one or more openings 758. Each multi-fiber feeder cable 685 can include, for example, 12, 24, 48, 72, or any other suitable quantity of fibers. Each feeder cable 685 is then split into single-fiber feeder cables and routed to optical splitters 830 (via splicing cassettes as described above with reference to FDH 100). In some embodiments, splitters 830 can have a 1 input×32 output configuration, a 1 input×16 output configuration, or any other suitable splitter configuration.

Figure 11:
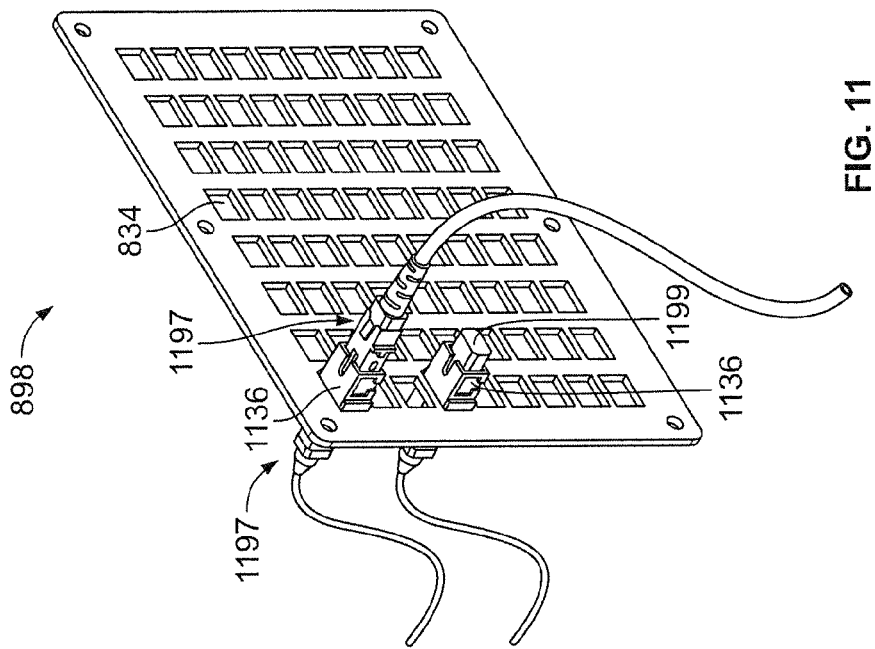
FIG. 11 is a perspective view of an adapter panel for use with the fiber distribution hub shown in FIGS. 6A and 6B.

Adapter/splitter panel 632 of frame body 624 can also be configured to couple to a plurality of adapter plates 898. As shown in FIG. 11, adapter plates 898 are either fixedly or selectively coupled to adapter/splitter panel 632. Each adapter plate 898 defines a plurality of openings 834. Openings 834 are sized to securely receive a plurality of adapters 1136 that optically couple splitter output cables from splitters 830 to connectorized ends of one or more distribution cables 683. Ends of adapters 1136 that are not coupled to splitter output cables can be coupled to a dust cap 1199 to prevent contaminants and dirt from interfering with any future connections.

Frame body 624 can also include one or more cable management trays 633. Cable management trays 633 can be coupled to adapter/splitter panel 632. Cable management trays 633 can be configured to efficiently route fiber optic cables to and from splitters 830 and to efficiently route fiber optic cables to and from adapters 1136. As shown in FIG. 6A, a cable management tray 633 can be positioned between each row of adapter panels 898 and between adapter panels 898 and splitter shelf 669.

As shown in FIG. 8, frame body 624 includes four adapter plates 834 above splitter shelf 669, and four adapter plates below splitter shelf 669. In other embodiments, frame body 624 can include more or less than eight total adapter plates 898.

Frame body 624 can also include side panels 666 and 668. Side panels 668 and 666 extend from adapter/splitter panel 632. Frame body 624 can also include first end panel 764 and second end panel 670. Frame body 624 can form a substantially rectangular prism. In other embodiments, frame body 624 can form any other suitable shape. Each side panel 666 and 668 can have one or more cable routing guides. For example, each side panel 666 and 668 can include a first series of cable routing guides 742a, a second series of cable routing guides 742b, a third series of routing guides 742c, and a fourth series of cable routing guides 742d.

Figure 12:
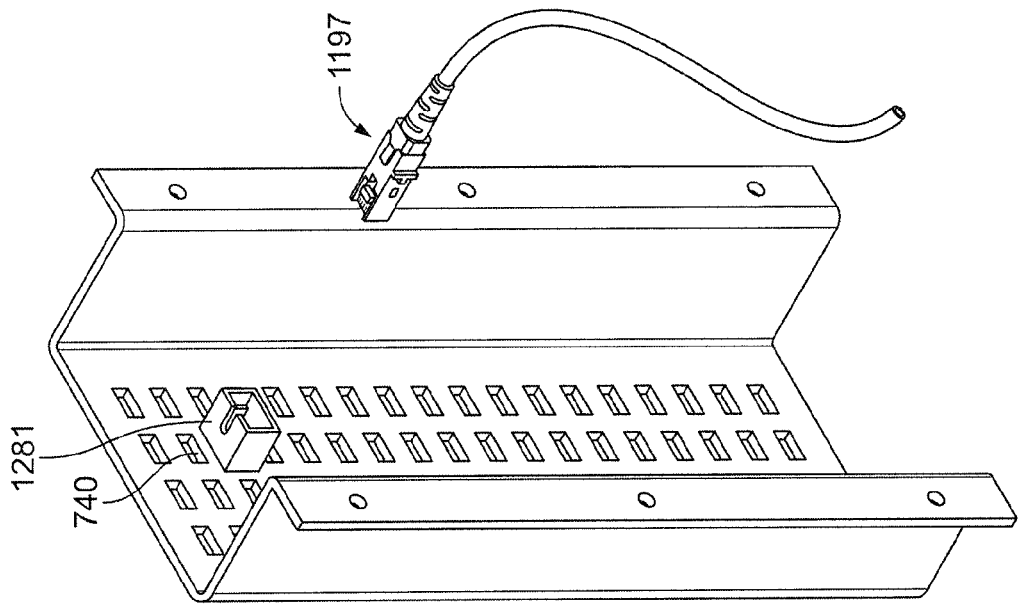
FIG. 12 a perspective view of a storage retaining structure for use with the fiber distribution hub of FIGS. 6A and 6B.

Each side panel 666 and 668 can have one or more storage retaining structures 740. For example, each side panel 666 and 668 can have one cable retaining structure 740 above splitter shelf 669 and one cable retaining structures 740 below splitter shelf 669. Each cable retaining structure 740 is configured to selectively couple to the ends of splitter output cables that are not being used—are not coupled with adapters 1136 on adapter panels 898. As shown in FIG. 12, retaining structure 740 can define a plurality of openings configured to securely receive adapters 1281 for coupling to the connectorized ends of the splitter output cables. In other embodiments, storage retaining structures 740 can include clips or any other suitable retaining mechanisms that can selectively couple to the unused splitter output cables.

Frame body 624 can be configured to rotate in a first direction from a first position as shown in FIG. 6A to a second position at which frame body 624 cannot rotate any further in the first direction as shown in FIG. 6B. Frame body 624 can further be configured to rotate in a second direction, opposite of the first direction, from the first position as shown in FIG. 6A to a third position at which frame body 624 cannot rotate any further in the second direction (which looks substantially similar to the second position shown in FIG. 6B in one embodiment). FDH 600 can include a pair of corresponding tabs on enclosure 602 and frame body 624 that contact each at the second position and at the third position to prevent further rotation. For example, as shown in FIG. 8, frame body 624 can include a tab 744 that extends from a surface of frame body 624, and enclosure 602 can include a tab 746 that extends from an inner surface of panel 608 of enclosure 602. Tabs 744 and 746 are positioned such that when frame body 624 is at the second position, tab 744 contacts tab 746 to prevent any further rotation in the first direction. Tabs 744 and 746 are positioned such that when frame body 624 is at the third position, tab 744 contacts tab 746 to prevent any further rotation in the second direction. Optical components of FDH 600 can remain optically coupled to distribution cable 683 and feeder cable 685 during rotation.

In one embodiment, the second position and the third position are about 360 degrees apart. In other embodiments, the second position and the third position are less than about 360 degrees apart, for example, 270 degrees, 180 degrees, or any other suitable amount.

As shown in FIG. 6B, frame body 624 can include second end panel 670 that extends from adapter/splitter panel 632. Second end panel 670 can be perpendicular to adapter/splitter panel 632 and side panels 666 and 668. Second end panel 670 can be configured to house one or more splicing cassettes that are configured to optically couple fibers of one or more distribution cables 683 with single-fiber splitter input cables of splitters 830. For example, a splice cassette tray 680 can be coupled to an inner surface of second end panel 670. Splice cassette tray 680 can be shaped to closely receive the one or more splicing cassettes. Accordingly, when frame body 624 rotates, splicing cassettes mounted on second end panel 670 rotate in unison with frame body 624. A single-fiber splitter input cable is optically coupled to an input of splitters 830, and a plurality of single-fiber splitter output cables are optically coupled to the splitter output cables. Each splitter input cable is routed from the splice cassette mounted on second end panel 670 to a respective splitter input of the optical splitter 830. Each splitter output cable is routed from the respective output of the optical splitter 830 to either adapters 1136 or storage retaining structure 740.

Accordingly, FDH 600 can provide access to second end panel 670 and any components mounted thereon (for example, one or more splicing cassettes), inputs of splitters 830, outputs of optical splitters 830, adapters 1136, and storage retaining structures 740 through selective rotation of frame body 624. Accordingly, rotation of frame body 624 can provide easy access to any component of FDH 600 and allow for repair or replacement. In some embodiments, frame body 624 can rotate about longitudinal axis LA about 180 degrees in one direction and about 180 degrees in the other direction from the first position. In other embodiments, frame body 624 can rotate more or less than 180 degrees in either direction.

In some embodiments, the first panel (not shown, but can be similar to panel 104 of FDH 100) and panels 610, 612, and 706 of enclosure 602 can be configured to be selectively coupled to panel 608, which can be coupled to pedestal base 688. Accordingly, the first panel and panels 610, 612, and 706 can be removed from panel 608 to provide 360 degree access to frame body 624 and the optical components mounted thereon similar to the view illustrated in FIG. 7. Such access can be desirable for repairing or replacing optical components. The first panel and panels 610, 612, and 706 can be recoupled to panel 608 after the repair or replacement.

In other embodiments, the first panel and panels 610, 612, and 706 can be omitted altogether. In effect, FDH 600 can be enclosure-less. In such embodiments, frame body 624 is rotatably coupled to panel 608 and pedestal base 688. This configuration can be used in high fiber density applications, for example, data centers. In such high fiber density applications, a plurality of FDHs 600, each without the first panel and panels 610, 612, and 706, can be used. The plurality of FDHs 600 can be arranged such that bushings 794 coupled to panels 764 of FDHs 600 are aligned. An elongated channel or support can be rotatably coupled to bushings 794 on panels 764 of each FDH 600 to provide an additional point of support. The elongated channel or support can be configured to run fiber optic cables between each FDH 600.

Figure 14:
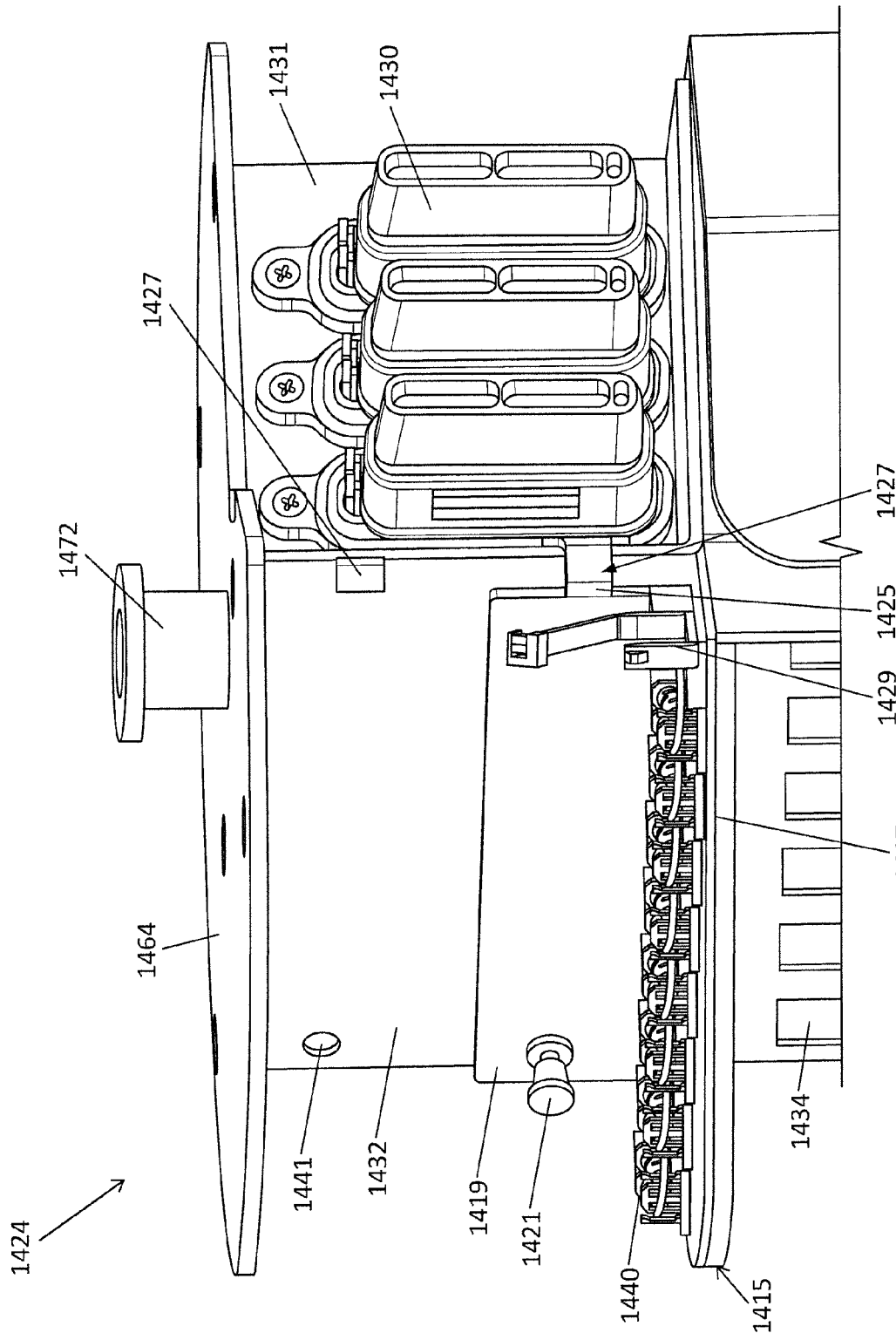
FIG. 14 is a perspective view of a frame body and a storage retaining structure according to another embodiment.
Figure 15:
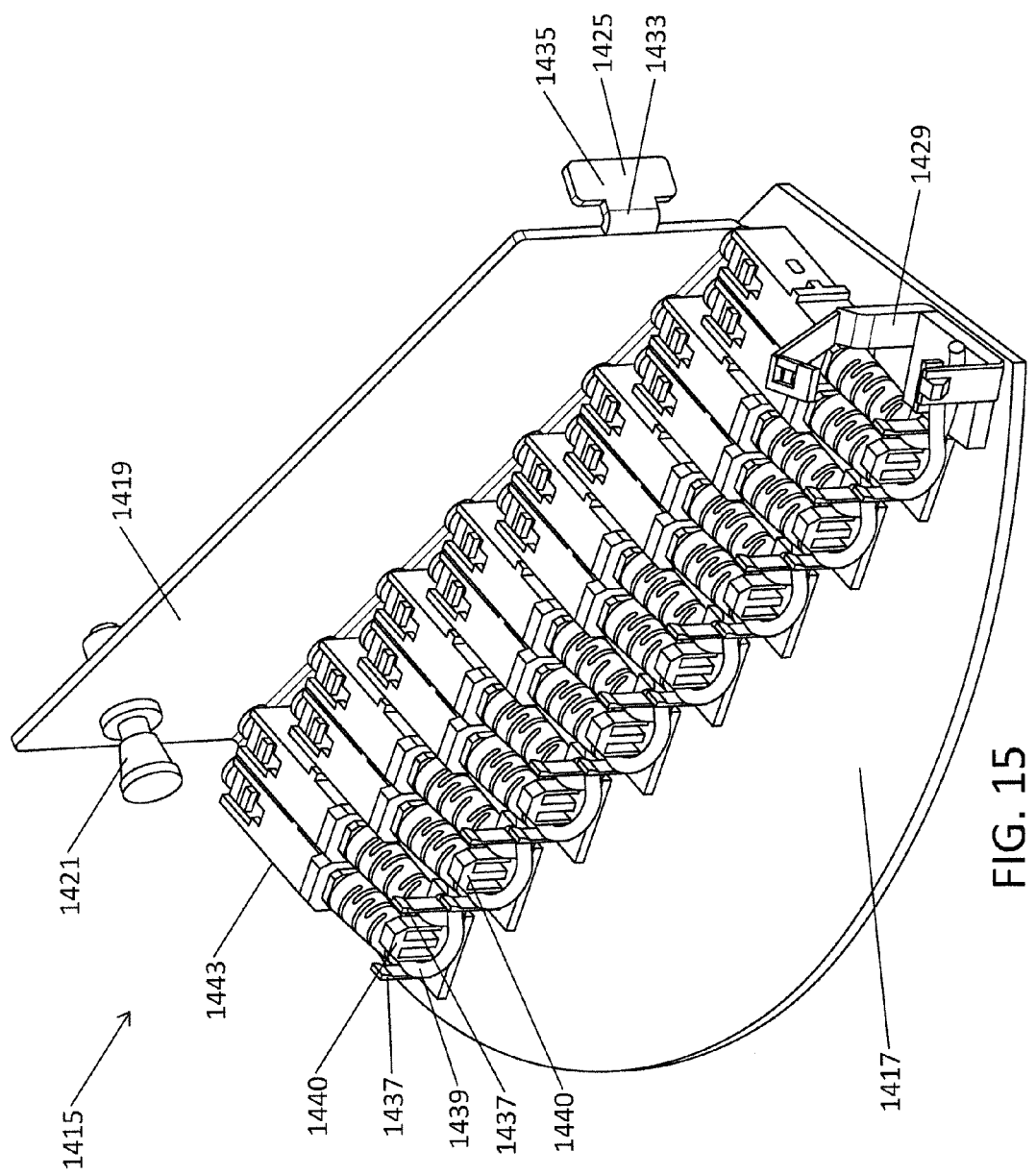
FIG. 15 is a perspective view of the storage retaining structure shown in FIG. 14.

FIG. 14 illustrates an embodiment of an axial end portion of a frame body 1424 for use with an FDH, for example, FDHs 100 and 600 described above. Frame body 1424 is configured to selectively couple with at least one storage retaining module 1415. FIGS. 14 and 15 illustrate an embodiment of storage retaining module 1415. Collectively referring to FIGS. 14 and 15, frame body 1424 and storage retaining module 1415 will now be described.

Frame body 1424 can include a first end panel 1464 that joins a splitter panel 1431 and an adapter panel 1432. First end panel 1464 may be perpendicular to both splitter panel 1431 and adapter panel 1432. A boss 1472 can extend from an outer surface of first end panel 1464. In some embodiments, boss 1472 can form, in part, a bearing mount, for example, bearing mount 126 of FDH 100 described above.

Adapter panel 1432 can be configured to be selectively coupled to at least one storage retaining module 1415. For example, adapter panel 1432 can be configured to be selectively coupled with one, two (as shown in FIG. 14 although only one storage retaining module 1415 is illustrated), or more than two storage retaining modules 1415. Storage retaining module 1415 can include at least one retaining structure 1440 configured to selectively couple with the ends of splitter output cables (for example, splitter output cables 138 in FIG. 1) when the splitter output cables are not connected to adapters. In some embodiments, each end of the splitter output cable includes a cable portion 1439 and a connector 1443. In some embodiments, as shown in FIGS. 14 and 15, each storage retaining module 1415 can include eight retaining structures 1440. Although the embodiment of FIGS. 14 and 15 show eight retaining structures 1440, storage retaining module 1415 can include less than or more than eight retaining structures 1440.

In some embodiments, storage retaining module 1415 includes a first panel 1417 and second panel 1419. First panel 1417 extends substantially perpendicular to a longitudinal axis of frame body 1424, and second panel 1419 extends substantially perpendicular to first panel 1417 and substantially parallel to the longitudinal axis of frame body 1424. In some embodiments, retaining structures 1440 are coupled to first panel 1417.

Storage retaining module 1415 is configured to be selectively coupled to frame body 1424. In some embodiments, adapter panel 1432 defines at least one notch 1427 and at least one corresponding opening 1441. The number of notches 1427 can correspond to the number of storage retaining modules 1415 adapter panel 1432 is configured to be selectively coupled to. In some embodiments, notch 1427 is formed at the edge of adapter panel 1427 as shown in FIG. 14. In some embodiments, storage retaining module 1415 includes a tab 1425 that engages notch 1427. Tab 1425 and notch 1427 can be configured to allow storage retaining module 1415 to pivot about the point of engagement while substantially preventing movement in a direction perpendicular to and away from the longitudinal axis of frame body 1424 at the point of engagement between tab 1425 and notch 1427.

In some embodiments, storage retaining module 1415 includes a locking device 1421 configured to selectively couple a side of storage retaining module 1415 that is opposite tab 1425 to adapter panel 1432. For example, locking device 1421 can be a nylatch or a snap-fit end that passes through opening 1441 defined by adapter panel 1421. Engaging locking device 1421 with opening 1441 couples the side of storage retaining module 1415 that is opposite tab 1425 with adapter panel 1434.

In some embodiments, storage retaining module 1415 includes at least one cable management latch 1429. Cable management latch 1429 can be mounted to first panel 1417. Cable management latch 1429 is configured to selectively move between an open position (shown in FIGS. 14 and 15) and a closed position (not shown). At the closed position, cable management latch 1429 secures the ends of splitter output cables to storage retaining module 1415.

Referring to FIG. 15, each retaining structure 1440 can be configured to receive at least one cable portion 1439 of a connectorized end of a splitter output cable. In some embodiments, retaining structure 1440 can define at least one channel 1437 to receive cable portion 1439. In some embodiments, channel 1437 has a width that closely corresponds to the diameter of cable portion 1439. When cable portion 1439 is received within channel 1437, connector 1443 of the respective connectorized end of the splitter output cable is positioned between retaining structure 1440 and second panel 1419. In some embodiments, each retaining structure 1440 defines two channels 1437 to each receive a cable portion 1439 of two connectorized ends of splitter output cables. Although FIGS. 14 and 15 show each retaining structure 1440 defining two channels 1437, each retaining structure 1440 can define one channel 1437 or more than two channels 1437. In some embodiments, each channel 1437 is defined by a pair of resilient fingers having a protrusion at their distal tips. The protrusions maintain cable portion 1439 of a connectorized end of a splitter output cable within channel 1437. In some embodiments, each channel 1437 is configured to receive at least two cable portions 1439.

In some embodiments, tab 1425 includes a neck portion 1433 and a distal portion 1435. Neck portion 1433 has a width smaller than the width of notch 1427 defined by adapter panel 1432, and distal portion 1435 has a width larger than the width of notch 1427 to substantially prevent the end of storage retaining module 1415 having tab 1425 from moving away from frame body 1424 when tab 1425 is engaged with notch 1427. In some embodiments, tab 1425 is formed at an edge of second panel 1419.

In some embodiments, to couple storage retaining module 1415 to frame body 1424, a user can align neck portion 1433 of tab 1425 within notch 1427 such that distal portion 1435 of tab 1425 is on a side of adapter panel 1434 closer to the longitudinal axis of frame body 1424. The user can then pivot storage retaining module 1415 such that locking device 1421 is aligned with a respective opening 1441 defined by adapter panel 1434. Next, the user can engage locking device 1421 with opening 1441 to secure retaining module 1415 to frame body 1424.

In some embodiments, storage retaining module 1415 can be used with fiber optic devices other than FDHs. For example, storage retaining module 1415 can be used with a fiber optic modular rack-chassis system.

Although the present embodiments have been described with reference to specific example embodiments, it will be evident that various modifications may be made to these embodiments without departing from the broader spirit and scope of the various embodiments. Accordingly, the specification and the drawings are regarded in an illustrative rather than a restrictive sense.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A fiber distribution hub comprising:
a frame body;
a plurality of optical splitters coupled to the frame body, each optical splitter comprising at least one splitter input and at least two splitter outputs optically coupled to splitter output cables comprising cable portions and connectorized ends;
a plurality of adapters coupled to the frame body and configured to be optically coupled to the connectorized ends of the splitter output cables; and
a storage retaining module configured to be selectively coupled to the frame body and comprising a storage retaining structure configured to selectively and directly secure an end cable portion of one of the splitter output cables not connected to one of the plurality of adapters.

2. The fiber distribution hub of claim 1, wherein the storage retaining structure defines a channel for receiving the cable portion of one of the splitter output cables.

3. The fiber distribution hub of claim 2, wherein the storage retaining structure comprises a pair of resilient fingers that define the channel.

4. The fiber distribution hub of claim 2, wherein the storage retaining structure defines a second channel for receiving a cable portion of a second one of the splitter output cables.

5. The fiber distribution hub of claim 1, wherein the storage retaining module further comprises a second storage retaining structure configured to selectively and directly secure a cable portion of a second one of the splitter output cables not connected to one of the plurality of adapters.

6. The fiber distribution hub of claim 1, wherein the frame body comprises a panel defining a notch; and wherein the storage retaining module further comprises a tab configured to selectively engage the notch.

7. The fiber distribution hub of claim 6, wherein the notch is defined at an edge of the panel.

8. The fiber distribution hub of claim 6, wherein the tab comprises a neck portion having a first width smaller than a width of the notch and a distal portion having a second width greater than the width of the notch.

9. The fiber distribution hub of claim 6, wherein the storage retaining module further comprises a locking device configured to selectively couple a side of the storage retaining module that is opposite the tab to the frame body.

10. The fiber distribution hub of claim 6, wherein the storage retaining module further comprises a first panel extending substantially perpendicular to a longitudinal axis of the frame body, and a second panel extends substantially perpendicular from the first panel;
wherein the storage retaining structure is mounted to the first panel; and
wherein the tab is coupled to the second panel.

11. The fiber distribution hub of claim 10, wherein the storage retaining module further comprises a cable management latch mounted to the first panel.

12. The fiber distribution hub of claim 1, wherein the storage retaining module further comprises a plurality of storage retaining structures.

13. The fiber distribution hub of claim 1, further comprising a second storage retaining module configured to be selectively coupled to the frame body and comprising a second storage retaining structure configured to selectively and directly secure a cable portion of a second one of the splitter output cables.

14. The fiber distribution hub of claim 1, wherein the frame body rotates entirely within an enclosure of the fiber distribution hub.

15. A storage retaining module configured to be selectively coupled to a frame body of a fiber distribution hub, the storage retaining module comprising:
a storage retaining structure configured to selectively and directly secure an end cable portion of a fiber optic cable not connected to an adapter coupled to the frame; and
a tab configured to selectively engage a notch defined in a panel of the frame body.

16. The storage retaining module of claim 15, further comprising a first panel extending substantially perpendicular to a longitudinal axis of the frame body and a second panel extends substantially perpendicular from the first panel when the storage retaining module is coupled to the frame body;
wherein the storage retain structure is mounted to the first panel; and
wherein the tab is coupled to the second panel.

17. The storage retaining module of claim 15, wherein the storage retaining structure defines a channel for receiving the cable portion of the fiber optic cable.

18. The storage retaining module of claim 17, wherein the storage retaining structure comprises a pair of resilient fingers that define the channel.

19. The storage retaining module of claim 17, wherein the storage retaining structure defines a second channel for receiving a cable portion of a second fiber optic cable.

20. The storage retaining module of claim 15, further comprising a second storage retaining structure configured to selectively secure a cable portion of a second fiber optic cable.

21. The storage retaining module of claim 15, wherein the tab comprises a neck portion having a first width smaller than a width of the notch and a distal portion having a second width greater than the width of the notch.

22. The storage retaining module of claim 15, wherein the storage retaining module further comprises a locking device configured to selectively couple a side of the storage retaining module that is opposite the tab to the frame body.

23. The storage retaining module of claim 15, further comprising a cable management latch.

24. The storage retaining module of claim 15, wherein a plurality of adapters are coupled to the panel defining the notch.

25. The fiber distribution hub of claim 1, wherein the frame body comprises a panel; wherein the plurality of adapters are coupled to the panel of the frame body; and wherein the storage retaining module is configured to be selectively coupled to the panel frame body.

* * * * *